United States Patent [19]

Malpass et al.

[11] Patent Number: 4,851,378
[45] Date of Patent: Jul. 25, 1989

[54] OLEFIN POLYMERIZATION OF COPOLYMERIZATION CATALYST COMPONENTS

[75] Inventors: Dennis B. Malpass, LaPorte; Loyd W. Fannin, Dickinson; Michael J. Breen, LaPorte, all of Tex.

[73] Assignee: Texas Alkyls, Inc., Deer Park, Tex.

[21] Appl. No.: 257,112

[22] Filed: Oct. 11, 1988

Related U.S. Application Data

[63] Continuation of Ser. No. 76,967, Jul. 23, 1987, abandoned.

[51] Int. Cl.$^4$ ............................................. C08F 4/64
[52] U.S. Cl. .................................. 502/103; 502/107; 502/108; 502/120; 556/190; 526/162
[58] Field of Search ............... 502/103, 107, 108, 120; 556/190

[56] References Cited

U.S. PATENT DOCUMENTS

| | | | |
|---|---|---|---|
| 3,135,809 | 6/1964 | Bosmajian | 502/103 X |
| 3,149,136 | 9/1964 | Bruce et al. | 556/190 X |
| 3,325,524 | 6/1967 | Lundeen | 556/190 X |
| 4,232,139 | 11/1980 | Minami et al. | 502/127 X |
| 4,311,816 | 1/1982 | Mollison et al. | 502/115 X |
| 4,324,691 | 4/1982 | Hartshorn et al. | 502/110 |

OTHER PUBLICATIONS

Hata et al, J. Org. Chem., vol. 28, pp. 3237–3238 (1963).
Hata, J. Chem. Soc., Chem. Comm., pp. 7–9 (1968).
Warwel et al,. Liebigs Ann., pp. 642–649 (1975).

*Primary Examiner*—Patrick P. Garvin
*Attorney, Agent, or Firm*—Richard P. Fennelly; Louis A. Morris

[57] ABSTRACT

Aluminum-containing compositions for use particularly as olefin polymerization or copolymerization cocatalysts are produced by reaction of trialkylaluminums or dialkylaluminum hydrides with 1,3- or 1,4-pentadiene at a mole ratio of aluminum compound to pentadiene of approximately 1:1, with removal during the reaction of evolved olefin.

8 Claims, No Drawings

OLEFIN POLYMERIZATION OF COPOLYMERIZATION CATALYST COMPONENTS

This is a continuation of application Ser. No. 76,967 filed July 23, 1987 and now abandoned.

BACKGROUND AND PRIOR ART

This application pertains to catalyst components for polymerization of olefins, particularly alpha-olefins. The catalyst components contain novel aluminum-containing compositions which are prepared by reaction of trialkylaluminums or dialkylaluminum hydrides with pentadienes.

Production of aluminum-containing compositions by reaction of aluminum compounds (particularly trialkylaluminums and dialkylaluminum hydrides) with diolefins, including pentadienes, is known in the art, for instance, in U.S. Pat. Nos. 3,149,136 and 3,325,524, and articles by Hata, *J. Org. Chem.*, Vol, 28, 3237 (1963) and *J. Chem. Soc., Chem. Comm.*, p. 7 (1968) and Warwel et al., Liebigs Ann., pp. 642-649 (1975). In these references, compounds such as tri-isobutylaluminum and diisobutylaluminum hydride were reacted with various longer chain diolefins to produce aluminum-containing products. Most of these reactions were carried out at mole ratios of diolefin:hydride of about 1:2. The literature (particularly Warwel et al.) indicates that reaction at such mole ratio results in a product having di-substitution by aluminum on the hydrocarbon chain. This same article also describes production of what is indicated as mono-substituted aluminum compounds. However, reactions of this type were carried out using large excesses of the diolefin (e.g., 6-10 moles diolefin per mole aluminum compound).

U.S. Pat. No. 3,325,524 claims that the yield of di-substituted aluminum compounds from reaction of diolefins with dialkylaluminum compounds at a 1:2 mole ratio can be improved by using an ethereal or nitrogenous complexing agent, and contains examples of such reactions, both with and without the complexing agents. It is also mentioned (col. 2, lines 53-69 and col. 4, lines 61-74) that the process (apparently with the complexing agent) can be conducted in two steps. In the first step, diolefin and hydride may be used in approximately stoichiometric quantities, although preferably the diolefin is used in up to 20% excess to minimize side reactions. According to this patent (col. 2, lines 52-69), a mono(aluminum)-substituted olefin is produced in the first step.

In general, the products of these processes have been indicated as being suitable as chemical intermediates of various types (U.S. Pat. No. 3,325,524) and generally suitable for use in olefin polymerization catalysts (U.S. Pat. No. 3,149,136).

As described below, the invention herein relates to the production of aluminum-containing compositions by reaction of trialkylaluminums or dialkylaluminum hydrides with 1,3- or 1,4-pentadiene at approximately equal molar ratio, under certain conditions, to produce a product which is extremely useful as a cocatalyst composition in olefin polymerization or copolymerization, and whose use results in catalysts having very good activity, and polyolefin products having a higher molecular weight, as evidenced by a low melt index, thus being suitable for use as film resins.

SUMMARY OF THE INVENTION

This invention comprises an aluminum-containing composition produced by reaction of a trialkylaluminum or an alkylaluminum hydride in which the alkyl groups each contain from 2 to 4 carbon atoms, with 1,3- or 1,4-pentadiene, said reaction being conducted at a mole ratio of aluminum compound:pentadiene of approximately 1:1, at a temperature of from about 85° to about 150° C., and with removal of evolved olefin from the reactor during the process.

This invention further comprises a process as just defined.

This invention also further comprises olefin polymerization or copolymerization catalysts containing, as a catalyst component, an aluminum-containing composition as previously defined, together with processes for polymerization or copolymerization of olefins utilizing catalysts containing such compositions.

DETAILED DESCRIPTION OF THE INVENTION

The compositions of this invention are produced by reaction of a trialkylaluminum or dialkylaluminum hydride with either 1,3-pentadiene or 1,4-pentadiene, said reaction being conducted at approximately equal molar ratios (about 1:1) of aluminum compound to diene, at a temperature of from about 85° to about 150° C., with either continuous or intermittent removal of olefin formed during the reaction. In general, the reaction is carried out in the absence of any solvent.

The aluminum-containing reactants in this process are trialkylaluminums and dialkylaluminum hydrides in which the alkyl groups contain from 2 to 4 carbon atoms. Examples of such compounds are triethylaluminum, diethylaluminum hydride, triisobutylaluminum and diisobutylaluminum hydride. The evolved olefin corresponds to the alkyl group or groups in the aluminum compound and will be ethylene, propylene, butene or isobutylene.

The following represent examples of production of compositions according to this invention.

EXAMPLE 1

Reaction of Diisobutylaluminum Hydride with 1,3-Pentadiene

In a pressure bottle there was placed 30.8 grams (g) (0.22 mole) diisobutylaluminum hydride, under a nitrogen atmosphere. The pressure bottle was fitted with a pressure gauge and relief valve. Heating was provided by a hot plate and oil bath. There was then added, incrementally, through a syringe, 22.0 g (0.23 mole) of technical grade (70% pure) 1,3-pentadiene. The molar ratio of hydride to pentadiene (taking the purity into account) was 0.96. The products were allowed to react for 4 hours at a temperature of 90°-135° C., with evolved isobutylene being vented when the pressure rose above about 20 psig. The reaction was ended when isobutylene evolution ceased.

There was obtained 50.6 g of a reaction product. A portion of this material was hydrolyzed and the hydrocarbon products were identified by gas chromatography. Aluminum analysis was made by standard EDTA titration using back titration with zinc sulfate.

The analysis of the product of this example showed 11.3 weight percent aluminum. The product was shown to contain 2.2% unreacted starting materials, 4.2% 1- pentene, 23.7% n-pentene and 69.8% isomeric $C_{10}$ hydrocarbons. The product of this example was faint yellow in color and had a relatively low viscosity.

EXAMPLE 2

Reaction of Diisobutylaluminum Hydride with 1,4-Pentadiene

In a pressure bottle there were placed 19.0 g (0.13 mole) diisobutylaluminum hydride and 8.8 g (0.13 mole) 1,4-pentadiene (which corresponds to a molar ratio of 1.0). The products were kept under nitrogen with heating provided as in Example 1.

The reaction was carried out for six hours, until evolution of isobutylene ceased, at a temperature of 100°–145° C. There was obtained 20.8 g of reaction product. Analysis as in Example 1 indicated the following: 16.3 weight percent aluminum 1.2% starting material, 5.0% 1-pentene, 86.0% n-pentene, and 7.8% isomeric $C_9$ and $C_{10}$ hydrocarbons. The product was colorless and had a low viscosity.

The compositions of this invention may be used for polymerization or copolymerization of various olefins, particularly alpha-olefins such as ethylene, propylene, 1-butene, 4-methyl-1-pentene, 1-hexene and 1-octene.

Olefin Polymerization

The following are examples of the use of compositions according to this invention in catalysts for the production of polyethylene. In the tables below, the following abbreviations have been used:

| Al/Ti | molar ratio - aluminum:titanium |
| --- | --- |
| dens | bulk density |
| MI | melt index [ASTM method D-1238, Condition E at 190° C. 2160 gram load (expressed as grams per 10 minutes] |
| MIR | melt index ratio [expressed as the ratio of the high load melt index (HLMI) to the melt index. HLMI obtained under same conditions as MI except with 21,600 gram/load, Condition F.] |
| TIBAL | triisobutylaluminum |

In accordance with the usual practice, the specific activity of the catalyst is expressed as kg polymer . g $Ti^{-1}$.atm $C_2H_4^{-1}$. $hr^{-1}$ Tables 1 and 2 below contain results of the slurry polymerization of ethylene employing cocatalysts utilizing compositions according to this invention.

The polymerization process employed a silica-supported titanium catalyst component prepared from magnesium chloride, tetrahydrofuran, titanium tetrachloride and dehydrated porous silica, according to Example 1a of U.S. Pat. No. 4,359,561 (col. 14, lines 34–60). The catalyst component thus prepared contained 1.25% by weight titanium.

The polymerization was carried out in a 4-liter reactor containing 2 liters hexane stirred at 1000 rpm. The temperature was 85±1° C.; the time was as indicated in the tables. Reactants were added in the following order: inventive compositions, titanium catalyst (200 mg), hydrogen (40 psig), ethylene (150 psig) total pressure. The reactor was vented after 60–90 minutes, the product filtered and vacuum dried.

Table 1 below gives results obtained using a combination of titanium catalyst with the products of Examples 1 and 2, respectively.

Also included for comparison, is an example similarly conducted, but using TIBAL as the cocatalyst.

TABLE 1

| Run | Co-Catalyst, Example | Al/Ti | $H_2$, psig | Time, min. | Specific Activity | dens. | MI | MIR |
| --- | --- | --- | --- | --- | --- | --- | --- | --- |
| A | 1 | 160 | 40 | 120 | 29.8 | 0.22 | <0.1 | 70 |
| B | 1 | 93 | 60 | 117 | 30.5 | 0.25 | <0.1 | >100 |
| C | 1 | 102 | 75 | 89 | 26.0 | 0.25 | 0.2 | 29 |
| D | 2 | 230 | 40 | 120 | 45.5 | 0.23 | <0.01 | >100 |
| E | 2 | 98 | 60 | 100 | 25.5 | 0.23 | <0.01 | >100 |
| Control | TIBAL | 100 | 40 | 60 | 9.9 | 0.28 | 1.0 | 34 |

Table 2 demonstrates the use of compositions according to this invention in combination with a trialkylaluminum cocatalyst, namely, triisobutylaluminum (TIBAL). The polymerization procedure was the same as that used for the examples described in Table 1. The results of this combination of catalysts is shown in the following Table 2. The control employed TIBAL alone and is the same as reported in Table 1.

TABLE 2

| | | (With TIBAL Catalyst) | | | | | | |
| --- | --- | --- | --- | --- | --- | --- | --- | --- |
| Run | Cocatalyst, Example | Al/Ti TIBAL | Al/Ti Invention | $H_2$, psig | Time, min. | Specific Activity | dens. | MI | MIR |
| F | 2 | 78 | 26 | 40 | 102 | 20.6 | 0.23 | 0.5 | 35 |
| G | 2 | 48 | 48 | 40 | 87 | 22.7 | 0.22 | 0.1 | 50 |
| H* | 2 | — | 230 | 40 | 120 | 45.5 | 0.23 | <0.01 | >100 |
| Control | — | 100 | — | 40 | 60 | 9.9 | 0.28 | 1.0 | 34 |

*Without TIBAL

Olefin Copolymerization

The following is an example of the use of compositions according to this invention in catalyts for copolymerization of olefins, in this case, of ethylene and 1-hexene. Copolymerization runs were conducted using the same procedures as for ethylene polymerization and adding 80 ml of 1-hexene before the inventive composition.

Table 3 demonstrates the utility of inventive compositions in copolymerizations to produce high molecular weight resins (low MI) with broader molecular weight distributions (higher MIR) compared to control experiments using TIBAL cocatalyst.

TABLE 3

(with hexene-1 comonomer)

| Run | Cocatalyst Example | Al/Ti | $H_2$, psig | Time, min. | Specific Activity | dens. | MI | MIR |
|---|---|---|---|---|---|---|---|---|
| I | 1 | 128 | 40 | 120 | 49.4 | 0.938 | 0.02 | 78 |
| J | 1 | 110 | 60 | 120 | 35.5 | 0.945 | 0.3 | 56 |
| K | 1 | 113 | 75 | 90 | 29.0 | 0.946 | 0.5 | 68 |
| L | 1 | 93 | 90 | 90 | 12.9 | 0.943 | 0.7 | 98 |
| M | 1* | 95 | 75 | 107 | 37.1 | 0.945 | 0.4 | 50 |
| N | 1* | 99 | 90 | 120 | 22.5 | 0.943 | 2.7 | 54 |
| O | 2 | 98 | 60 | 100 | 25.2 | 0.941 | 0.01 | 108 |
| Control | TIBAL | 97 | 40 | 90 | 37.1 | 0.934 | 1.0 | 31 |
| Control | TIBAL | 103 | 60 | 90 | 20.2 | 0.950 | 5.4 | 32 |
| Control | TIBAL | 99 | 75 | 90 | 22.8 | 0.951 | 7.7 | 31 |
| Control | TIBAL | 106 | 90 | 90 | 12.1 | 0.951 | 19.8 | — |

*A second composition prepared according to Example 1.

What is claimed is:

1. A supported titanium-containing olefin polymerization catalyst comprising, as a cocatalyst component, a composition formed by reacting a trialkylaluminum or a dialkylaluminum hydride, in which the alkyl groups each contain 2 to 4 carbon atoms, with a diolefin selected from the group consisting of 1,3-pentadiene and 1,4-pentadiene, at a molar ratio of aluminum compound to diolefin of approximately 1:1, at a temperature of from about 85° C. to about 150° C., while removing evolved olefin during the reaction.

2. An olefin polymerization or copolymerization catalytic system according to claim 1 further comprising a trialkylaluminum compound.

3. A catalyst as claimed in claim 1 wherein the diolefin is 1,3-pentadiene.

4. A catalyst as claimed in claim 1 wherein the diolefin is 1,4-pentadiene.

5. A catalyst as claimed in claim 3 wherein a trialkylaluminum is reacted.

6. A catalyst as claimed in claim 3 wherein a dialkylaluminum hydride is reacted.

7. A catalyst as claimed in claim 4 wherein a trialkylaluminum is reacted.

8. A catalyst as claimed in claim 4 wherein a dialkylaluminum hydride is reacted.

* * * * *